United States Patent [19]

Umehara et al.

[11] Patent Number: 5,168,184
[45] Date of Patent: Dec. 1, 1992

[54] SWING-TYPE ACTUATOR

[75] Inventors: Teruo Umehara, Hanyu; Saburo Okada, Fukaya, both of Japan

[73] Assignee: Hitachi Metals, Ltd., Tokyo, Japan

[21] Appl. No.: 770,347

[22] Filed: Oct. 3, 1991

[30] Foreign Application Priority Data

Oct. 4, 1990 [JP] Japan ............................ 2-104692[U]
Dec. 20, 1990 [JP] Japan ............................ 2-403962[U]
Jan. 10, 1991 [JP] Japan .............................. 3-3511[U]

[51] Int. Cl.⁵ .................... H02K 33/00; G11B 5/55
[52] U.S. Cl. ................................... 310/13; 360/106
[58] Field of Search ................... 310/12, 13, 15; 360/104, 105, 106, 122, 125

[56] References Cited

U.S. PATENT DOCUMENTS

| | | | |
|---|---|---|---|
| 4,150,407 | 4/1979 | Dijkstra | 360/106 |
| 4,196,456 | 4/1980 | Manzke et al. | 360/106 |
| 4,544,973 | 10/1985 | Van De Bult | 360/106 |
| 4,553,058 | 11/1985 | Iwasaki | 310/268 |
| 4,639,624 | 1/1989 | Ejiri et al. | 310/154 |
| 4,849,840 | 7/1989 | Fujioka | 360/104 |
| 4,855,853 | 8/1989 | Matsushita et al. | 360/104 |
| 4,879,617 | 11/1989 | Sampietro et al. | 360/106 |
| 4,949,194 | 8/1990 | MacPherson et al. | 360/104 |
| 4,951,023 | 8/1990 | Erd et al. | 335/222 |
| 4,985,652 | 7/1991 | Oudet et al. | 310/15 |
| 5,034,837 | 7/1991 | Schmitz | 360/105 |

FOREIGN PATENT DOCUMENTS

| | | | |
|---|---|---|---|
| 55-67975 | 5/1980 | Japan | 360/106 |
| 56-19561 | 2/1981 | Japan | 360/106 |
| 58-57721 | 4/1983 | Japan | 360/106 |
| 59-124066 | 7/1984 | Japan | 360/106 |
| 60-159566 | 10/1985 | Japan | 360/106 |
| 63-142574 | 6/1988 | Japan | 360/106 |
| 64-89946 | 4/1989 | Japan | 360/106 |
| 2-310865 | 12/1990 | Japan | 360/70 |

*Primary Examiner*—Steven L. Stephan
*Assistant Examiner*—Matthew Nguyen
*Attorney, Agent, or Firm*—Finnegan, Henderson, Farabow, Garrett & Dunner

[57] ABSTRACT

The swing-type actuator includes (a) a housing comprising a pair of yokes opposing each other and a permanent magnet attached to at least one of the yokes, for defining a magnetic gap therebetween; (b) a swingable arm having one end to which a movable coil is fixed and the other end to which a function member can be attached such that a part of the movable coil is swingable in the magnetic gap; (c) at least one platelike projection having a through-hole and integrally projecting from the swingable arm adjacent movable coil; and (d) a hold member made of a thermoplastic resin and, for the portion encompassing the part of the coil movable through the magnetic gap, having substantially the same thickness as that part of the movable coil, the hold member being molded such that it encompasses the outer periphery of the movable coil and embeds the projection, thereby fixing the movable coil to the arm.

8 Claims, 4 Drawing Sheets

SWING-TYPE ACTUATOR

BACKGROUND OF THE INVENTION

The present invention relates to a swing-type actuator such as an actuator for magnetic disk drives, and more particularly to a swing-type actuator capable of swinging a function member such as a magnetic head along a circular course.

Conventionally, the positioning of a magnetic head on a recording track of a magnetic disk, etc. is conducted by a swing-type or rotation-type actuator as shown in FIGS. 9 and 10. In both figures, a yoke 1 is fixedly provided with permanent magnets 2, and a pair of yokes 1 are assembled by supports 3 such that different magnetic poles of the permanent magnets 2 are opposite each other via a magnetic gap 4 to form a magnetic circuit. 5 represents an arm having one end to which a flat movable coil 6 is fixed, and the other end to which a magnetic head (not shown) is fixed. The arm 5 is arranged such that the movable coil 6 located in the magnetic gap 4 can swing around a shaft 7.

When an operation signal is supplied to the movable coil 6, a magnetic force generated from the movable coil 6 according to Fleming's left hand rule functions as an attraction force or a repulsion force to each permanent magnet 2, so that the arm 5 is rotated around the shaft 7. As a result, a magnetic head fixed to a tip end of the arm 5 is positioned on a desired magnetic track of a magnetic disk (not shown). The direction of the rotation of the arm 5 can be changed by inverting the direction of current applied to the movable coil 6.

In the above conventional actuator for magnetic disk drives, the movable coil 6 is usually fixed to the arm 5 by an adhesive. However, the fixing of the movable coil 6 by an adhesive is sometimes troublesome, failing to provide accurate positioning of the movable coil 6. In addition, handling of terminals of the movable coil 6 is complicated, lowering the efficiency of assembling of the arm 5. Since there is increasingly higher demand for miniaturization and reduction in thickness of magnetic disk drives, it is necessary to improve the positioning accuracy of the movable coil 6, and the efficiency and reliability of fixing of the movable coil 6 to the actuator 5. In this sense, the conventional arms fail to satisfy these requirements.

To solve the above problems, attempts have been made to integrally fix a movable coil 6 to an arm 5 by an integral resin molding (for instance, U.S. Pat. No. 4,855,853 and Japanese Utility Model Laid-Open No. 60-159566). In such a structure, the movable coil can be supported by a simplified structure, and the thickness of the movable coil can be extremely reduced. Accordingly, such a structure is advantageous for miniaturizing actuators.

However, in the above resin-molded structures, the actuator does not have sufficient mechanical strength, particularly resistance to detachment and bending strength, and the fixing of the arm 5 to the movable coil 6 is insufficient. Particularly, when the periphery of the arm 5 on the side of the movable coil 6 is circular or in a curved shape, or when the arm 5 has a narrow bonding area, it is difficult for the actuator to have sufficient strength.

Also, since the movable coil 6 is embedded in a molding, there are resin layers on both sides of the movable coil 6, leading to a thicker actuator. If such a thick actuator is used, the magnetic gap 4 should be enlarged. Accordingly, the magnetic properties of the permanent magnets 2 cannot be fully utilized, so that the actuator fails to exhibit sufficient performance and driving power.

OBJECT AND SUMMARY OF THE INVENTION

Accordingly, an object of the present invention is to provide a small and thin swing-type actuator which has a coil-arm molding structure having significantly increased strength.

The swing-type actuator according to the present invention comprises:

(a) a housing comprising a pair of yokes and a permanent magnet attached to at least one of the yokes opposing each other for defining a magnetic gap therebetween;

(b) a swingable arm having one end to which a movable coil is fixed and the other end to which a function member is fixed, such that the movable coil is swingable in the magnetic gap;

(c) at least one platelike projection having a throughhole and integrally projecting from the swingable arm on the side of the movable coil; and (d) a hold member made of a thermoplastic resin and having substantially the same thickness as that of the movable coil, the hold member being molded such that it encompasses a periphery of the movable coil and the planar projection, thereby fixing the movable coil to the arm.

DETAILED DESCRIPTION OF THE PREFERRED EMBODIMENTS

Figure 1:
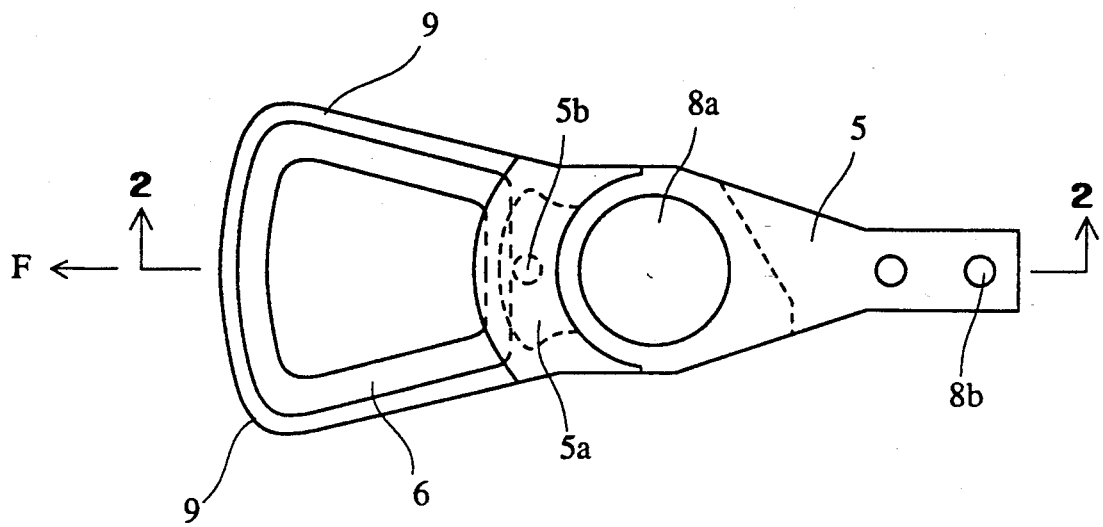
FIG. 1 is a plan view showing the swing-type actuator according to one embodiment of the present invention.
Figure 2:
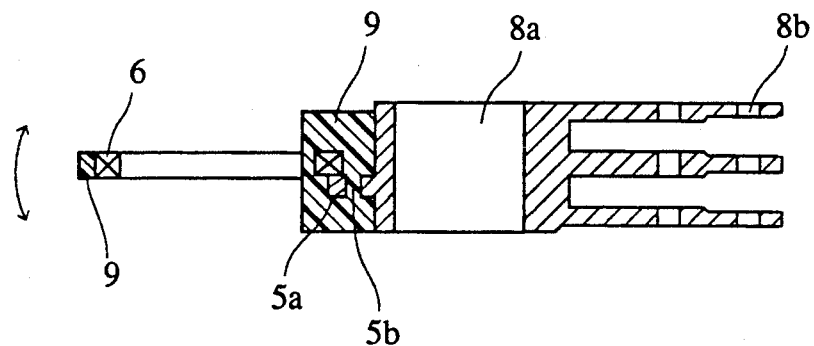
FIG. 2 is a cross-sectional view taken along the line 2—2 in FIG. 1.

The first embodiment of the present invention will be explained referring to FIGS. 1 and 2 in which the same reference numerals are assigned to the same parts as those in FIGS. 9 and 10.

An arm 5, which is produced from an aluminum alloy by a die casting method, has an aperture 8a in a center portion. A shaft (not shown) is rotatably fitted in the aperture 8a, so that the arm 5 is rotatably supported by a housing (not shown). The arm 5 is also provided with an aperture 8b at one end for mounting a function member (not shown) such as a magnetic head to the arm 5.

The arm 5 is integrally provided with a planar projection 5a on the side of the movable coil 6. The projection 5a has a through-hole 5b. In this embodiment, the projection 5a has a contour resembling a dovetail when viewed from above, that is, in a direction perpendicular to the plane in which arm 5 rotates. Accordingly, this projection 5a in FIG. 1 is called "dovetail-shaped projection."

A hold member 9, which is formed of a thermoplastic resin, encompasses the outer periphery of the movable coil 6 and also embeds the dovetail-shaped projection 5a. Accordingly, the thermoplastic resin of the hold member 9 enters into the through-hole 5b of the dovetail-shaped projection 5a of arm 5, so that the movable coil 6 and the dovetail-shaped projection 5a are strongly fixed by means of the hold member 9.

Incidentally, the movable coil 6 can be produced by winding a which has a self-melting coating around a core at a predetermined number of turns to form a multi-layer coil and then flowing current through this coil to generate heat for integrally fusing the coatings.

In the present invention, the arm 5 and the hold member 9 are integrally joined or fixed preferably by injection molding. In the injection molding, the arm 5 and the movable coil 6 having lead wires to which terminal pins (not shown) are soldered are placed in an injection mold, and a molten thermoplastic resin such as a glass fiber-reinforced polyphenylene sulfide resin are injected into the mold. After solidification, the resulting assembly is taken out of the mold. By injection molding, the arm 5, the coil 6 and the hold member 9 are integrally fixed together.

By the above structure, the movable coil 6 is strongly supported by the hold member 9 along its periphery, and the dovetail-shaped projection 5a is embedded in the thermoplastic resin constituting the hold member 9. Also, since the thermoplastic resin enters into the through-hole 5b, the or fixing strength of the arm 5 to the movable coil 6 is extremely high. That is, due to the dovetail-shaped projection 5a provided with the through-hole 5b, the resistance of the movable coil 6 from being detached from the arm 5 in the direction F (see FIG. 1) is extremely high, and the bending strength of the arm is also improved.

Figure 3:
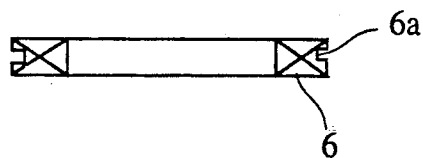
FIG. 3 is a cross-sectional view showing a movable coil according to another embodiment of the present invention.

FIG. 3 shows a movable coil 6 according to another embodiment of the present invention. In FIG. 3, 6a represents a circumferential groove of the movable coil 6 for preventing the movable coil 6 from being detached from the hold member 9. The groove 6a functions to increase the fixing strength of the movable coil 6 to the hold member 9.

Figure 4:
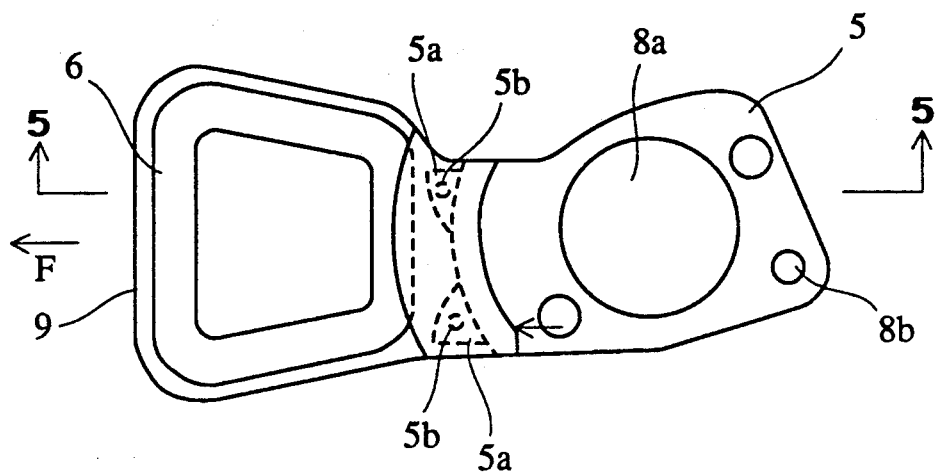
FIG. 4 is a plan view showing the swing-type actuator according to a further embodiment of the present invention.
Figure 5:
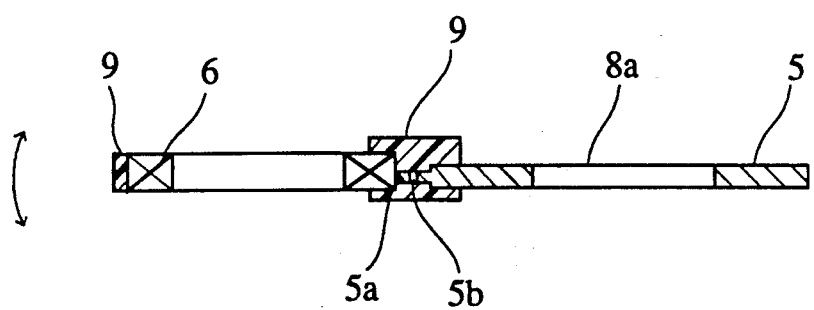
FIG. 5 is a cross-sectional view taken along the line 5—5 in FIG. 4.
Figure 9:
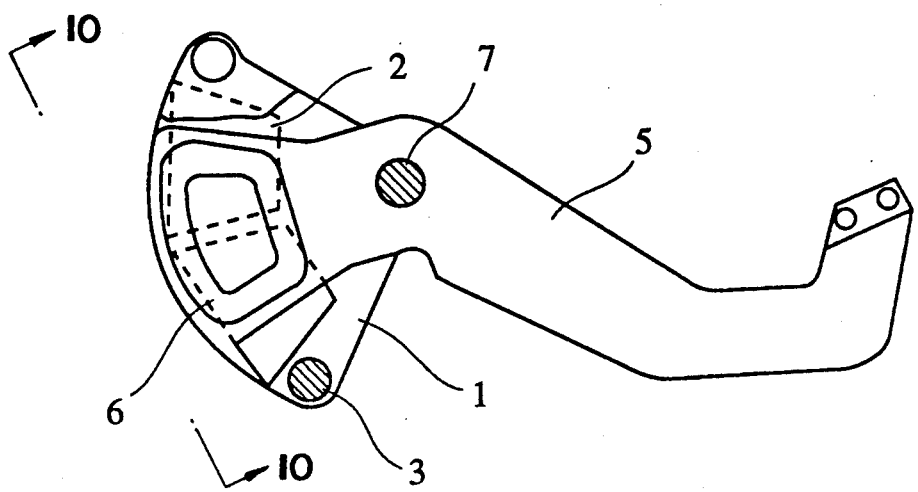
FIG. 9 is a partially cross-sectional plan view showing one conventional swing-type actuator.
Figure 10:
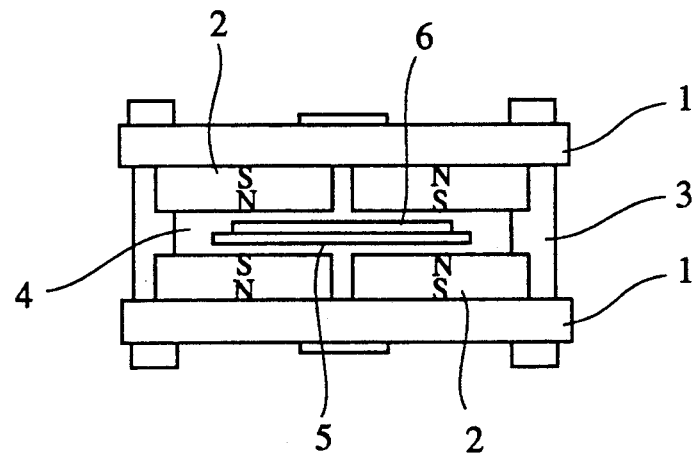
FIG. 10 is a side view of the swing-type actuator of FIG. 9 when viewed from 10—10 in FIG. 9.

FIGS. 4 and 5 show another embodiment of the present invention, in which the same reference numerals are assigned to the same parts as those in FIGS. 9 and 10. In this embodiment, the projection 5a has the contour of a triangle whose bottom side is adjacent to the end of the arm 5 when viewed from above. Accordingly, this projection 5a is called "triangular projection." In this embodiment, two triangular projections 5a, 5a are provided on the arm 5. Except for the shape of the planar projection 5a, the actuator of this embodiment basically is the same as those of FIGS. 1 and 2 although the shapes of the respective arms 5 differ somewhat.

The embodiment in FIGS. 4 and 5 is preferable when the arm 5 is as thin as about 2-3 mm, and when the movable coil 6 is fixed to the arm 5 at a large curvature (the angle between the center line of the movable coil 6 and the center line of the arm 5 is large). In such a structure, a single projection cannot ensure sufficient bonding strength between the arm 5 and the movable coil 6. Accordingly, two triangular projections 5a, 5a are formed at the end of the arm 5. By this structure, the hold member 9 can strongly fix the movable coil 6 to the arm 5. The resistance to the detachment of the movable coil 6 from the arm 5 in the direction "F" in FIG. 4 is also extremely high.

Figure 6:
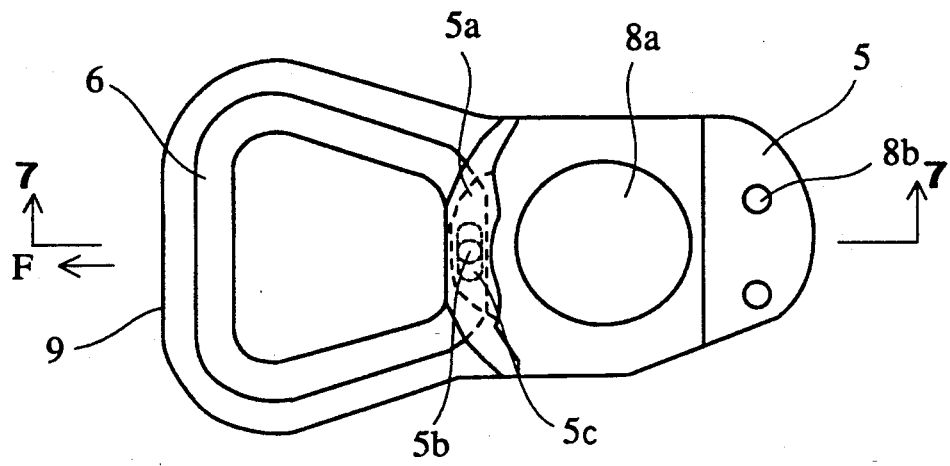
FIG. 6 is a plan view showing the swing-type actuator according to a still further embodiment of the present invention.
Figure 7:
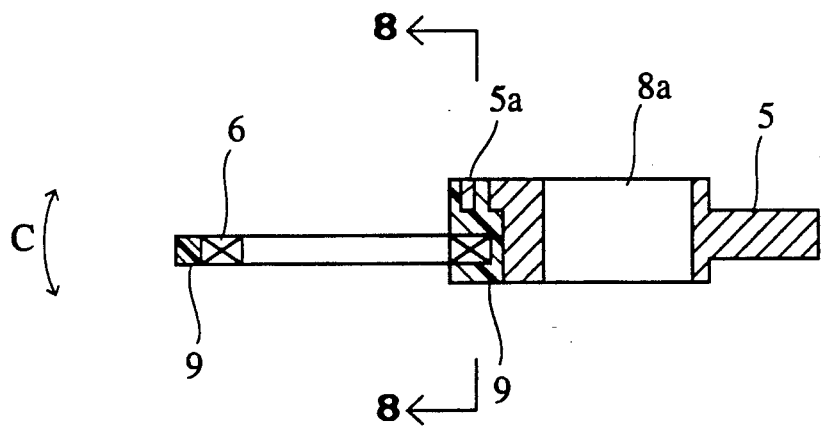
FIG. 7 is a cross-sectional view taken along the line 7—7 in FIG. 6.
Figure 8:
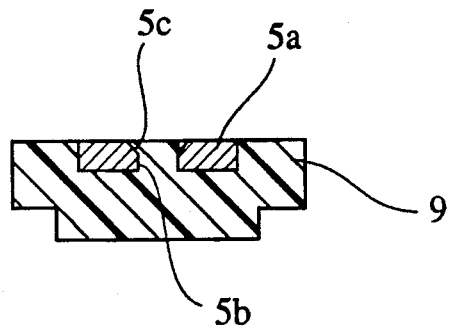
FIG. 8 is a cross-sectional view taken along the line 8—8 in FIG. 7.

FIGS. 6–8 show a further embodiment of the present invention, in which the same reference numerals are assigned to the same parts as those in FIGS. 9 and 10. In this embodiment, the projection 5a has a recess 5c around the through-hole 5b on at least one side of the projection 5a. Incidentally, the recess 5c may be provided on any of the planar projections shown in FIGS. 1, 2, 4 and 5. By this recess 5c, the thermoplastic resin can easily enter into the through-hole 5b. Except for the shape of the planar projection 5a and the end of the arm 5 to which a function member is to be attached, the actuator of this embodiment is basically the same as those of FIGS. 1 and 2.

The embodiment in FIGS. 6–8 is preferable when the movable coil 6 is thin such as in a half-height voice coil motor so that the movable coil 6 cannot be fixed to the arm 5 with a sufficient thickness.

The thermoplastic resins for constituting the hold member 9 may be selected depending upon rigidity and heat resistance required. Examples of such thermoplastic resins include polyarylene sulfides such as polyphenylene sulfide, polyamide resins, polyimide resins, polyamideimide resins, polyester resins such as polybutylene terephthalate, polybutylene naphthalate, etc. These thermoplastic resins are preferably heat-resistant resins.

The thermoplastic resins should have a longitudinal modulus of $10 \times 10^4$ kg/cm$^2$ or more (measured according to ASTM D-638), and the longitudinal modulus is preferably $13 \times 10^4$ kg/cm$^2$ or more. Particularly, it is preferable to use liquid crystal polymers (showing liquid crystallinity in a molten state) such as liquid crystal polyesters (having rigid skeletons).

The portion of hold member 9 encompassing the part of coil 6 which is movable through the magnetic gap has substantially the same thickness as that part of the movable coil 6. Accordingly, the magnetic gap can be reduced, leading to increased driving force and response speed.

In the above embodiments, the actuators for magnetic heads are described, but it should be noted that the swing-type actuator of the present invention can be applicable not only to magnetic heads but also to optical heads, etc. Also, a magnetic circuit may be constituted by one or more permanent magnets attached to one of the two yokes.

As described above in detail, in the swing-type actuators according to the present invention, the positioning accuracy of the movable coil and the fixing strength of the movable coil to the arm are greatly increased. By using the hold member with the portion encompassing the coil part movable through the gap having substantially the same thickness as that part of the movable coil, the magnetic gap can be reduced, resulting in a higher driving force and a rapid response.

What is claimed is:

1. A swing-type actuator comprising:

(a) a housing comprising a pair of yokes opposing each other and a permanent magnet attached to at least one of said yokes for defining a magnetic gap therebetween;
(b) a coil having an outer periphery, and having a part with a thickness for being movable through said magnetic gap;
(c) a swingable arm having one end adapted to receive said movable coil and another end to which a function member is fixable, such that said part of said movable coil is swingable in said magnetic gap;
(d) at least one platelike projection having a through-hole and projecting from said one end of said swingable arm; and
(e) a hold member made of a thermoplastic resin, said hold member being formed such that it encompasses said outer periphery of said movable coil and embeds said projection including extending into said through-hole, thereby fixing said movable coil to said arm, wherein the portion of said hold member encompassing said coil part has substantially the same thickness as said coil part.

2. The swing-type actuator according to claim 1, wherein said platelike projection has a dovetail shape.

3. The swing-type actuator according to claim 2, wherein said platelike projection has a recess around said through-hole.

4. The swing-type actuator according to claim 1, wherein said platelike projection has a triangular shape.

5. The swing-type actuator according to claim 4, wherein said platelike projection has a recess around said through-hole.

6. The swing-type actuator according to claim 1, wherein said platelike projection has a recess around said through-hole.

7. The swing-type actuator according to claim 1, wherein said platelike projection is integral with said arm.

8. The swing-type actuator according to claim 1, wherein said hold member is formed by molding.

* * * * *